UNITED STATES PATENT OFFICE.

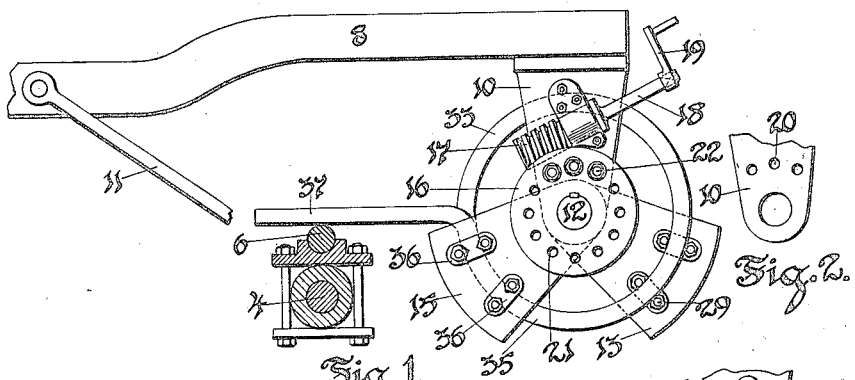

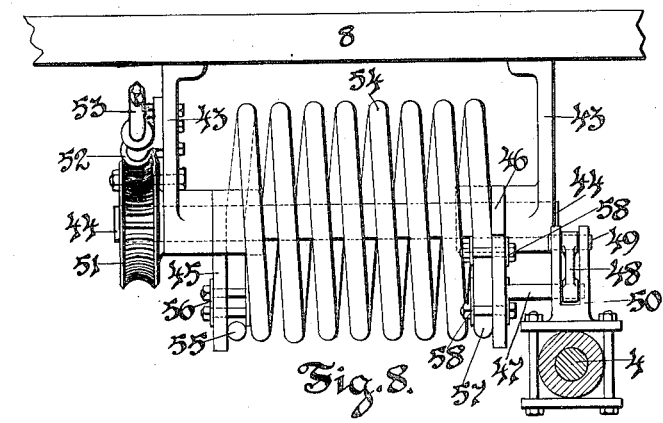
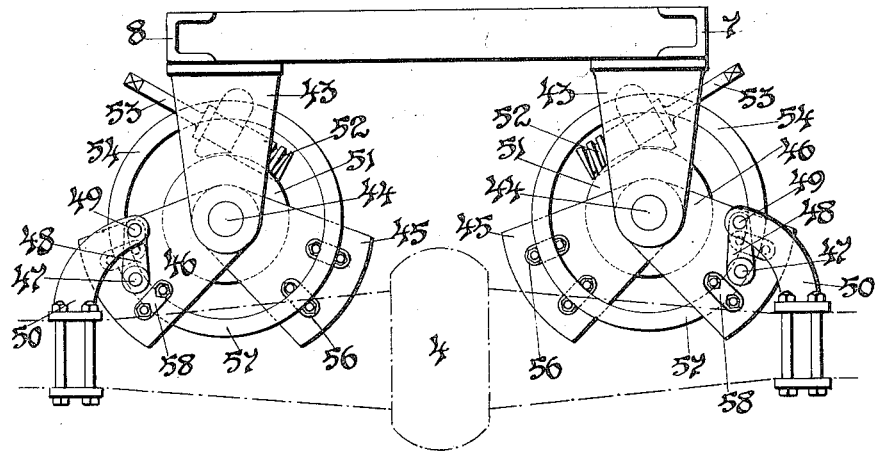
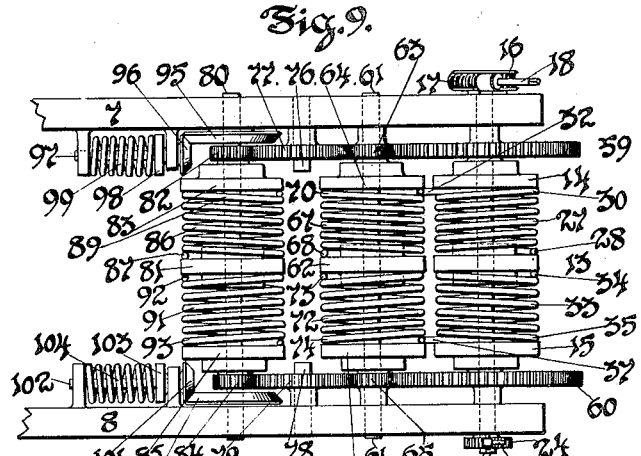

JAMES JOSEPH GRIFFIN, OF SAN FRANCISCO, CALIFORNIA, AND GORDON MOFFITT PEACOCK, OF SOUTH YARRA, MELBOURNE, VICTORIA, AUSTRALIA.

ROAD-VEHICLE SHOCK-ABSORBER.

1,091,884.  Specification of Letters Patent.  Patented Mar. 31, 1914.

Application filed November 20, 1912. Serial No. 732,470.

*To all whom it may concern:*

Be it known that we, JAMES JOSEPH GRIFFIN, a citizen of the United States of America, and a resident of 2921 Howard street, in the city of San Francisco, State of California, United States of America, and GORDON MOFFITT PEACOCK, a subject of the King of Great Britain and Ireland, and a resident of 1 Garden street, South Yarra, a suburb of the city of Melbourne, in the county of Bourke, State of Victoria, Commonwealth of Australia, have invented certain new and useful Improvements in Road-Vehicle Shock-Absorbers, of which the following is a specification.

This invention relates to apparatus particularly applicable to motor vehicles and interposed between the wheels and bodies thereof, whereby road inequalities are absorbed and the effect of shocks greatly reduced.

Hitherto many appliances have been suggested to attain this end, many of which have been either costly, complicated, inaccessible, liable to derangement or not effective under and adjustable to varying conditions.

The object of this invention is to provide a simple and comparatively inexpensive apparatus readily applicable to existing vehicles, which will be positive in action and will absorb shocks more effectively than has usually been the case with spring devices when road inequalities have been encountered by the vehicle wheels. With the invention helical springs are used and are adapted to wind or to un-wind as the wheels rise and fall in relation to the vehicle body. The winding effect is obtained by securing one end of a spring to the vehicle frame and controlling the other end by variations in the distance between the vehicle frame and axle. The springs are capable also of being readily adjusted in tension to accommodate varying vehicle loads.

Referring to the drawings which form a part of this specification:—Figure 1 is a side elevation showing in section a vehicle back axle and portion of a frame or chassis with the invention applied thereto. Fig. 2 is a side view of portion of a hanger showing holes for the holding or locking of a coiled spring. Fig. 3 is an end view of Fig. 1 a handle being removed from a worm shaft. Fig. 4 is a side view showing another method of holding or locking a coiled spring. Fig. 5 is a part sectional view of a dash pot, the use of which with the invention is optional. Fig. 6 is a reduced side view of a frame or chassis the front and back wheels of which are equipped with this invention. Fig. 7 is a reduced side view of a frame or chassis the front and back wheels of which are equipped with this invention arranged in a modified manner. Fig. 8 is a side elevation showing in section a vehicle back axle and portion of a frame or chassis with the invention applied thereto in the modified manner. Fig. 9 is an end view of Fig. 8 the axle being shown in broken lines for convenience of illustration. Fig. 10 is a plan to show the scope of the invention and how an indefinite number of springs may be used for each wheel.

The invention includes a front axle 2 supported by front wheels 3 and a back axle 4 supported by back wheels 5. Carried by each axle, or by a bracket or the like clamped to the same, are anti-friction rollers 6. Above the axles is a frame or chassis consisting of a right member 7 and a left member 8. Depending from the right member 7 are front and back right hangers 9. Depending from the left member 8 are front and back left hangers 10. Pivotally connected to each axle may be the lower ends of radius rods 11. The upper end of each radius rod is pivotally connected to the chassis. The radius rods may be disposed either longitudinally, laterally or in any other direction.

Mounted (Figs. 1 to 6) in the front hangers and in the back hangers are cross shafts 12. Secured to each cross shaft 12 is a fixed member 13. Loosely embracing each cross shaft 12, at or near one end thereof, is a right loose member 14. Loosely embracing each cross shaft, at or near the other end thereof, is a left loose member 15.

Attached to one end of each cross shaft 12 is a worm wheel 16 in engagement with the worm 17 of a worm shaft 18. The worm shaft 18 may be mounted in any suitable bearings carried by the hangers adjoining it or by the frame or chassis. Each worm shaft 18 is provided with a removable crank handle 19. Formed (Fig. 2) in the hanger adjoining each worm wheel 16 is a series of holes 20. Formed in each worm wheel 16 is a series of holes 21.

Accommodated by the holes 20 and 21 and locking the worm wheel and the shaft 12 upon which it is mounted to the corresponding hanger are one or more pins or bolts 22. Instead of employing a worm wheel and worm however a screw and nut or any other suitable devices for turning a shaft may be employed. Instead also of the foregoing pins or bolts and holes any other suitable shaft holding devices may be used such as (Fig. 4) a ratchet wheel 24 may be secured to each cross shaft 12. By a pivot pin 25 a pawl 26 is then pivoted to the hanger adjoining each ratchet wheel and engages the teeth of the said ratchet wheel.

With the foregoing is used a right hand spring 27 having an inner end 28 secured by clamps 29 to the fixed member 13. The outer end 30 of each spring 27 is secured by clamps 31 or the like to the right loose member 14. Projecting from the outer end 30 of each right hand spring 27 is an extension or arm 32 bearing upon a corresponding friction roller 6 of the adjoining vehicle axle. Encircling each cross shaft is also a left hand spring 33 having an inner end 34 secured by the clamps 29 to the fixed member 13. The outer end 35 of each left hand spring is secured by clamps 36 to the corresponding left loose member 15. Projecting from the outer end 35 of each left hand spring 33 is an extension or arm 37 bearing upon a corresponding friction roller 6 of the adjoining vehicle axle.

Secured to the chassis, above each axle thereof, may be (Fig. 5) one or more oil containing cylinders or dash pots 38. Within each cylinder 38 is a piston 39 having therein a series of perforations 40. Secured to each piston is the upper end of a piston rod 41 the lower end of which is pivotally connected to the vehicle axle beneath it. In each piston rod 41 is a ball or knuckle joint or joints 42.

Instead of the shafts 12 being situated across the chassis, as described, they may be longitudinally disposed as regards the same. With such an arrangement (Figs. 8 and 9) two hangers 43 are provided depending from each of the frame members 7 and 8 at the front and back thereof. Each pair of hangers accommodates a longitudinal shaft 44. Secured to each shaft 44 at one end thereof is a fixed member 45. Loosely embracing each shaft 44, at the other end thereof, is a loose member 46. Protruding from each loose member 46 is a pin 47. Pivoted to the outer end of each pin 47 is a lower end of a link 48. Pivoted by a pivot pin 49 to the upper end of each link 48 is a bracket 50 secured to the corresponding vehicle axle. Or a shackle or the like may be employed.

Mounted upon each longitudinal shaft 44 is a worm wheel 51. Engaging each worm wheel 51 is the worm 52 of a worm shaft 53. Each shaft 53 is provided with a removable crank handle (not shown). Each longitudinal shaft 44 may be provided with holding bolts or a ratchet wheel as are the cross shafts 12 already described. Encircling each longitudinal shaft 44 is a spiral spring 54 having an inner end 55 secured by clamps 56 to the corresponding fixed member 45. The outer end 57 of each spring 54 by clamps 58 is secured to the corresponding loose member 46.

With each cross shaft 12 and its springs 27 and 33 and its worm wheel 16 may be used (Fig. 10) auxiliary and supplementary shafts and springs. To employ the auxiliary and supplementary shafts there is attached to each right loose member 14 a right toothed wheel 59. Or a toothed sector may be used. Attached to each left loose member 15 is a left toothed wheel 60. Or a toothed sector may be used. Adjoining each cross shaft 12 when additional springs are required is an auxiliary stationary shaft 61 having a centrally disposed fixed member 62. Loosely mounted upon each auxiliary shaft is a right toothed pinion 63 engaging the right toothed wheel 59. Attached to each right pinion 63, in any well known way, is a right member 64 loosely mounted upon the shaft 61. Loosely mounted upon the shaft 61 is also a left toothed pinion 65 engaging the left toothed wheel 60. Secured to each left pinion 65 is a left member 66 loosely mounted upon the shaft.

Encircling each auxiliary shaft 61 is a right spring 67 having an inner end 68 secured in any well known way to the fixed member 62. The outer end 70 of each right spring 67, in any well known way, is secured to the right loose member 64. Encircling the auxiliary shaft 61 is a left spring 72 having an inner end 73 secured in any well known way to the fixed member 62. The outer end 74 of each left spring 72 is secured, in any well known way, to the loose member 66.

Projecting from the right member 7 of the frame or chassis, adjacent the auxiliary shaft 61, is a right stud 76 upon which is mounted a right idle toothed wheel 77 engaging the right pinion 63. Projecting from the left member 8 of the frame or chassis, adjacent the auxiliary shaft 61, is a left stud 78 upon which is mounted a left idle toothed wheel 79. This engages the left pinion 65.

Adjoining the auxiliary shaft 61 may be a supplementary shaft 80. Secured to the supplementary shaft 80, at or near the middle thereof, is a fixed member 81. Loosely mounted upon the shaft 80 is a right toothed pinion 82 engaging the right idle wheel 77. Loosely mounted upon each shaft 80 and attached to each right pinion 82 in any well known way is a right member 83. Loosely mounted upon each shaft 80 is a left toothed pinion 84 engaging the left idle wheel 79. Loosely mounted upon each shaft 80 and secured to each left pinion 84 in any well known way is a left member 85.

Encircling each supplementary shaft 80 is a right spring 86 having an inner end 87 secured in any well known way to the fixed member 81. The outer end 89 of each spring 86 is secured in any well known way to the right loose member 83. Encircling each supplementary shaft 80 is also a left spring 91 having an inner end 92 secured in any well known way to the fixed member 81. The outer end 93 of each left spring 91 is secured in any well known way to the left loose member 85.

Loosely mounted upon each supplementary shaft 80 and attached to the right toothed pinion 82 in any well known way may be a right bevel wheel 95. Engaging each right bevel wheel 95 is a right bevel pinion 96 secured to one end of a right longitudinal shaft 97 having a fixed member 98. Encircling each right longitudinal shaft 97 is a right spring 99 one end of which is secured to the said member 98 in any well known way and the other end of which, in any well known way is secured to the chassis or frame or a projection therefrom. Loosely mounted upon each supplementary shaft 80, and secured in any well known way to the left pinion 84 thereon, is a left bevel wheel 100. Engaging each left bevel wheel is a left bevel pinion 101. This is mounted upon a left longitudinal shaft 102 mounted in suitable bearings carried by the left member 8 of the chassis. Fixed to the left longitudinal shaft 102 is a left member 103. Encircling the longitudinal shaft 102 is a left spring 104 one end of which is secured, in any well known way, to the member 103 and the other end of which, in any well known way, is secured to the chassis or frame or a projection therefrom.

With this invention by means of the worm wheels 16 and 51, any spiral spring may be wound to a predetermined tension. The shaft encircled by the spiral spring is then prevented from rotating by means of the pins or bolts 22, or by the ratchet wheel 24. Upon a vehicle wheel encountering a road inequality, when the embodiment first described is employed, the extension or arm of the relative spring (27 or 33) is elevated with the road wheel. The loose member attached to the arm also rises moving loosely upon the cross shaft 12. The shaft 12 and the other end of the spring in action being stationary the said spring is more or less wound up, and the shock distributed spirally through the coils thereof. When the springs and shaft are longitudinally disposed as shown in Figs. 7, 8 and 9 the relative brackets 50 and links 48 rise with the vehicle wheel. By means of its pin 47 the corresponding loose member 46 is also operated and the spring attached thereto more or less wound up.

The object of the cylinders or dash pots 38 which are common and well known articles is to act as a brake in the event of rhythmic oscillations being set up in the spring. The oil within a cylinder or dash pot 38 it will be clear passes through the perforations of the pistons thereby restricting the movement thereof, and thus controlling to a greater or lesser degree the oscillations referred to.

The auxiliary and supplementary shafts are shown in Fig. 10 for illustrative purposes to show a compound suspension. It will be clear that the action of the springs is similar to that already described the toothed wheels conveying the movements of one spring to another and thereby distributing shocks over a greater spring area.

There may be any number of supplementary and auxiliary shafts disposed in any desired manner according to circumstances. The longitudinally disposed shafts 97 and 102 may be inclined or vertically arranged or disposed in any other direction according to circumstances, and instead of using auxiliary supplementary and longitudinal shafts it is obvious that any combination whatever may be made with any one or more of them and the cross shaft 12. Similar combinations could also be made with the longitudinal shafts 44.

An important practical feature of our invention is that the coil spring is adjustably mounted on the shaft, as 12; such shaft being fixed as against rotation when the apparatus is in use; and the plate or segment 15 to which the outer end of the spring is connected is pivoted on shaft 12. This segment or plate 15 positions the part or arm 37 against lateral movement. It also prevents undue distortion of the outermost coil of the spring, and insures helical winding of the spring, so that the pressure imparted from the part 37 to the spring is exerted to partly wind the spring and is not exerted initially in distorting the first coil of the spring, but is transmitted to the entire spring giving it a helical twist.

Having now described our invention what we claim as new and desire to secure by Letters Patent is:—

1. The combination with a vehicle frame and an axle below said frame, of a shaft having a fixed member and a loose member, a helical spring encircling said shaft and having a fixed end secured to the fixed member and a moving end secured to the loose member, an arm projecting from the moving end of the spring and bearing upon the axle, a worm wheel having holes therethrough mounted upon said shaft, a worm shaft for turning said wheel, and pins accommodated by the holes in the wheel to retain it in the position to which it is turned.

2. The combination with a vehicle frame and a front and a back axle below said frame, of front hangers and back hangers depending from said frame, a cross shaft mounted in the front hangers, a cross shaft mounted in the back hangers, a fixed member secured to each shaft, a loose member embracing each shaft at each side of the fixed member thereof, a helical spring encircling each shaft between the fixed member and each loose member thereof, one end of each spring being attached to a fixed member and the other end to a loose member, an arm projecting from each spring adjacent each loose member and bearing upon the adjoining vehicle axle, a worm wheel having holes therethrough mounted upon said shaft, a worm shaft for turning said wheel, and pins accommodated by the holes in the wheel to retain it in the position to which it is turned.

3. The combination with a vehicle frame and axles supporting road wheels below said frame, of a shaft adjoining each vehicle wheel, a fixed member secured to each shaft, a loose member embracing each shaft, a helical spring encircling each shaft and having a fixed end secured to the fixed member and a moving end secured to the loose member thereof, means connecting the loose members with the vehicle axle and a worm wheel for turning said shaft, and a worm controlling said wheel.

4. The combination with a vehicle frame and an axle below said frame, of a horizontally disposed helical spring winding and un-winding by variation in the distance between the axle and the frame, a supplementary helical spring adjoining the said horizontal spring, and means to wind and unwind the supplementary spring by the winding and un-winding of the horizontal spring.

5. The combination with a vehicle frame and an axle below said frame, of a horizontally disposed helical spring having a fixed end and having a moving end controlled by the axle, and a plurality of supplementary and auxiliary helical springs each having a fixed end and each having a moving end controlled by the horizontal helical spring.

6. The combination with a vehicle frame and an axle below said frame, of a horizontally disposed helical spring having a fixed end and having a moving end controlled by the axle, a plurality of supplementary and auxiliary helical springs each having a fixed end and each having a moving end controlled by the horizontal helical spring, and a common means to vary the tension of all of the springs.

7. The combination with a vehicle frame and an axle below said frame, of a horizontally disposed helical spring having a fixed end and a moving end, a shaft encircled by said spring and controlling the fixed end thereof, the moving end of the spring being controlled by the vehicle axle, supplementary and auxiliary springs each having a fixed end and a moving end, and toothed wheels to transfer movement of the moving end of the horizontal spring to the moving ends of the supplementary and auxiliary springs.

8. The combination with a vehicle frame and an axle below said frame, of a cross shaft carried by the frame, a horizontally disposed helical spring encircling said shaft and having a fixed end controlled thereby and a moving end controlled by the axle, a plurality of supplementary and auxiliary shafts carried by the frame, a supplementary or auxiliary helical spring encircling each said shaft and having a fixed end controlled thereby and having a moving end, toothed wheels mounted upon the supplementary and auxiliary shafts and communicating movement of the moving end of the horizontally disposed helical spring to the moving ends of the supplementary and auxiliary springs, and means mounted upon the cross shaft for varying the tension of all of the springs.

9. In combination with a vehicle frame and running gear, a swinging member pivotally mounted on and below said frame, having its free end slidably supported upon an adjacent part of the running gear so as to be affected by relative movement of the frame and gear, and a spring having one end connected with the frame and the other with said swinging member, said swinging member varying the tension of the spring according to the relative movements of the frame and gear and also preventing undue distortion of the connected coil of the spring and insuring helical winding thereof.

10. In combination with a vehicle frame, a shaft fixed thereon, a helical spring having one end fixed to said shaft, a pivoted swinging member to which the other end coil of the spring is so connected that distortion of such coil is prevented, and a part connected with said member and bearing upon an adjacent part of the running gear, whereby variation in the distance between the frame and running gear varies the tension of the spring.

11. In combination with a vehicle frame, a shaft mounted thereon, a helical spring having one end fixed to said shaft, a swinging member pivoted on said shaft to which the other end coil of the spring is connected, said swinging member having a slidable bearing upon an adjacent part of the running gear whereby variation in the distance between the frame and running gear varies the tension of the spring and imparts a helical winding to the spring; with means whereby said shaft may be adjusted rotatorily to tension the spring.

12. In combination with a vehicle frame, a running gear, a shaft rotatably supported on and below said frame, a rocking member pivoted on said shaft, a spring having one end connected with the shaft and the other with said member, and having an end projecting beyond said member and slidably resting upon a part of the running gear, said rocking member preventing undue distortion of the outermost coil of the spring and insuring helical winding thereof.

13. In combination with a vehicle frame and running gear, a swinging member pivoted on the frame, a helical spring having one end fixed to a part of the frame, and its other end fixed to said swinging member, the latter end of said spring also bearing upon an adjacent part of the running gear, whereby variation in the distance between the frame and running gear varies the tension of the spring, substantially as described.

14. The combination with a vehicle frame and running gear, of a shaft, a helical spring encircling said shaft, a fixed end to each spring controlled by said shaft, a moving end to each spring engaging an adjacent part of the running gear, a loose member on the shaft, means connecting the moving end of the spring with said loose member, the tension of the spring being varied by variation in the distance between the frame and running gear, means for turning the shaft to tension the spring, and means for retaining the shaft in the position to which it has been turned.

15. The combination with a vehicle frame and running gear, a shaft, a fixed member and a loose member on said shaft, a helical spring encircling said shaft and having a fixed end secured to the fixed member and a moving end secured to the loose member, said moving end of the spring having a slidable bearing on the adjacent part of the running gear whereby the tension of the spring is affected by variation in the distance between the frame and running gear.

16. The combination with a vehicle frame and a running gear, of a shaft mediately supported on the frame and a fixed member and a loose member on said shaft, a helical spring encircling said shaft and having a fixed end secured to the fixed member and a moving end secured to the loose member, an arm projecting from the moving end of the spring, means connecting said arm with an adjacent part of the running gear whereby the tension of the spring is affected by variation in the distance between the frame and running gear, and means for turning the shaft and its fixed member to vary the tension of the spring.

In testimony whereof I affix my signature in presence of two witnesses.

JAMES JOSEPH GRIFFIN.

Witnesses as to the signature of James Joseph Griffin:
ANDREW WILLIAM LIVINGSTON,
JOHN HAROLD MURCH, Jr.

In testimony whereof I affix my signature in presence of two witnesses.

GORDON MOFFITT PEACOCK.

Witnesses as to the signature of Gordon Moffitt Peacock:
CECIL M. C. CLASTRIER,
GEORGE A. M'REN.